United States Patent
Löwenmark et al.

(10) Patent No.: US 9,749,852 B2
(45) Date of Patent: Aug. 29, 2017

(54) MOBILE STATION, ACCESS NODE AND VARIOUS METHODS FOR IMPLEMENTING AN ACCELERATED SYSTEM ACCESS PROCEDURE

(71) Applicant: TELEFONAKTIEBOLAGET L M ERICSSON (PUBL), Stockholm (SE)

(72) Inventors: Stefan Eriksson Löwenmark, Färentuna (SE); Mårten Sundberg, Årsta (SE); Paul Schliwa-Bertling, Ljungsbro (SE); Nicklas Johansson, Brokind (SE); John Walter Diachina, Garner, NC (US)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 134 days.

(21) Appl. No.: 14/662,075

(22) Filed: Mar. 18, 2015

(65) Prior Publication Data

US 2015/0271665 A1    Sep. 24, 2015

Related U.S. Application Data

(60) Provisional application No. 61/968,621, filed on Mar. 21, 2014.

(51) Int. Cl.
*H04W 8/26* (2009.01)
*H04L 5/00* (2006.01)
(Continued)

(52) U.S. Cl.
CPC ............. *H04W 8/26* (2013.01); *H04L 5/0055* (2013.01); *H04W 74/08* (2013.01);
(Continued)

(58) Field of Classification Search
CPC ...... H04L 1/16; H04L 5/0055; H04W 74/002; H04W 74/08; H04W 74/0833;
(Continued)

(56) References Cited

U.S. PATENT DOCUMENTS 6,366,779 B1 *  4/2002  Bender ................. H04W 76/02
                                                           370/335
8,331,516 B2 * 12/2012  Yoo ....................... H04L 5/0092
                                                           375/360

(Continued)

FOREIGN PATENT DOCUMENTS

EP           2 365 717 A1    9/2011
WO    WO 2004/100598 A1    11/2004
WO    WO 2011/111013 A1    9/2011

OTHER PUBLICATIONS

3rd Generation Partnership Project; Technical Specification Group GSM/EDGE Radio Access Network; General Packet Radio Service (GPRS); Mobile Station (MS)—Base Station System (BSS) interface; Radio Link Control / Medium Access Control (RLC/MAC) protocol (Release 12); 3GPP TS 44.060 V12.0.0 (Mar. 2014); the whole document.

(Continued)

*Primary Examiner* — Chi H Pham
*Assistant Examiner* — Robert Lopata

(57) ABSTRACT

A mobile station (e.g., an MTC device), an access node (e.g., BSS) and various methods are described herein for implementing an accelerated system access procedure (ASAP) which improves the radio resource utilization efficiency by having: (1) the mobile station transmit a packet channel request to the access node, where the packet channel request includes a unique identifier associated with the mobile station, and (2) the access node after receiving the packet channel request transmits an Immediate Assignment (IA) message to the mobile station, where the IA message
(Continued)

includes the unique identifier associated with the mobile station.

26 Claims, 5 Drawing Sheets

(51) Int. Cl.
  *H04W 74/08* (2009.01)
  *H04L 1/16* (2006.01)
  *H04W 74/00* (2009.01)
  *H04W 72/04* (2009.01)
(52) U.S. Cl.
  CPC ... *H04W 74/0833* (2013.01); *H04W 74/0866* (2013.01); *H04L 1/16* (2013.01); *H04W 72/048* (2013.01); *H04W 74/002* (2013.01)
(58) Field of Classification Search
  CPC ....... H04W 8/26; H04W 72/04; H04W 72/12; H04W 76/00; H04B 7/2121; H04B 7/2123; H04J 2203/0069; H04Q 2213/394
  USPC .......................................................... 370/329
  See application file for complete search history.

(56) References Cited

U.S. PATENT DOCUMENTS

| | | | |
|---|---|---|---|
| 8,374,133 B2 | 2/2013 | Diachina et al. | |
| 2003/0123413 A1* | 7/2003 | Moon ................. | H04J 13/0048 370/335 |
| 2006/0268774 A1* | 11/2006 | Kangas ............... | H04L 12/1877 370/329 |
| 2009/0175246 A1* | 7/2009 | Koo ...................... | H04L 1/0003 370/336 |
| 2010/0322342 A1* | 12/2010 | Josiam ................. | H04L 1/0057 375/295 |
| 2011/0013717 A1* | 1/2011 | Josiam .............. | H04W 72/0413 375/295 |
| 2011/0105158 A1* | 5/2011 | Arora .................... | H04W 48/14 455/466 |
| 2011/0217980 A1* | 9/2011 | Faurie ................... | H04W 72/04 455/435.1 |
| 2011/0222527 A1* | 9/2011 | Hole .................. | H04W 74/0891 370/348 |
| 2011/0223932 A1* | 9/2011 | Hole ................. | H04W 56/0005 455/456.1 |
| 2012/0082120 A1* | 4/2012 | Chun .................... | H04L 5/0053 370/329 |
| 2013/0115966 A1* | 5/2013 | Kang ................ | H04W 72/0406 455/450 |
| 2013/0148618 A1* | 6/2013 | Navratil ................ | H04W 72/04 370/329 |
| 2013/0272273 A1 | 10/2013 | Lopez et al. | |
| 2014/0038622 A1* | 2/2014 | Zhu ....................... | H04W 72/02 455/450 |
| 2015/0230203 A1* | 8/2015 | Diachina ............... | H04W 68/02 370/329 |

OTHER PUBLICATIONS

3rd Generation Partnership Project; Technical Specification Group GSM/EDGE Radio Access Network; General Packet Radio Service (GPRS); Mobile Station (MS)—Base Station System (BSS) interface; Radio Link Control / Medium Access Control (RLC/MAC) protocol (Release 12), 3GPP TS 23.060 V12.4.0 (Mar. 2014), the whole document.
3rd Generation Partnership Project; Technical Specification Group GSM/EDGE Radio Access Network; Multiplexing and multiple access on the radio path (Release 12), 3GPP TS 45.002 V12.1.0 (Nov. 2013), the whole document.
3$^{rd}$ Generation Partnership Project; Technical Specification Group GSM/EDGE Radio Access Network; Channel coding (Release 12), 3GPP TS 45.003 V12.0.0 (Nov. 2013), the whole document.
Ericsson et al.: "Optimized System Access Procedure", 3GPP TSG-GERAN #54, Sanya, China, May 14-18, 2012; GP-120623; 3rd Generation Partnership Project (3GPP), Mobile Competence Centre; 650, Route des Lucioles; F-06921 Sophia-Antipolis Cedex; France, the whole document.
Nokia Siemens Networks: "Peak Load Control for MTC Devices", 3GPP TSG GERAN#49, Chengdu, P.R. China; Feb. 28-Mar. 4, 2011; Tdoc GP-110231, 3$^{RD}$ Generation Partnership Project (3GPP), Mobile Competence Centre; 650, Route des Lucioles; F-06921 Sophia-Antipolis Cedex; France, the whole document.

\* cited by examiner

MOBILE STATION, ACCESS NODE AND VARIOUS METHODS FOR IMPLEMENTING AN ACCELERATED SYSTEM ACCESS PROCEDURE

CROSS-REFERENCE TO RELATED APPLICATIONS

This application claims the benefit of priority to U.S. Provisional Application No. 61/968,621, filed on Mar. 21, 2014. The entire contents of this application are hereby incorporated herein by reference for all purposes.

TECHNICAL FIELD

The present disclosure relates to a mobile station, an access node (e.g., Base Station Subsystem (BSS)) and various methods for implementing an accelerated system access procedure (ASAP) which improves the radio resource utilization efficiency by having: (1) the mobile station transmit a packet channel request to the access node, where the packet channel request includes a unique identifier associated with the mobile station, and (2) the access node after receiving the packet channel request transmits an Immediate Assignment (IA) message to the mobile station, where the IA message includes the unique identifier associated with the mobile station.

BACKGROUND

The following abbreviations are herewith defined, at least some of which are referred to within the following description of the present disclosure.
AGCH Access Grant Channel
ASAP Accelerated System Access Procedure
ASIC Application-Specific Integrated Circuit
BSC Base Station Controller
BSIC Base Transceiver Station Identity Code
BSS Base Station Subsystem
CV Countdown Value
DL Downlink
EPROM Erasable Programmable Read. Only Memory
EEPROM Electrically Erasable Programmable Read-Only Memory
EGPRS Enhanced General Packet Radio Service
FAI Final Ack Indicator
FPGA Field-Programmable Gate Array
GERAN GSM EDGE Radio Access Network
GSM Global System for Mobile Communications
IA Immediate Assignment
IM Instant Messaging
MCS Modulation and Coding Scheme
MS Mobile Station
MTC Machine Type Communications
PACCH Packet Associated Control Channel
PDTCH Packet Data Traffic Channel
P-TMSI Packet Temporary Mobile Subscriber Identity
PUAN Packet Uplink Ack/Nack
RAM Random Access Memory
RACH Random Access Channel
RLC Radio Link Control
ROM Read Only Memory
RRBP Relative Reserved Block Period
RSSI Received Signal Strength Indicator
SDT Small Data Transmission
SGSN Serving GPRS Support Node
TBF Temporary Block Flow
TCP Transmission Control Protocol
TLLI Temporary Logical Link Identity
UDP User Datagram Protocol
UL Uplink In the wireless telecommunications field, it is desirable to improve the radio resource utilization efficiency between a mobile station and a network (e.g., a network node such as a BSS). Various ways that can be used to improve the radio resource utilization efficiency between the mobile station and the network (e.g., a network node such as a BSS) are the subject of the present disclosure.

SUMMARY

A mobile station, an access node (e.g., BSS), and various methods implementing an accelerated system access procedure (ASAP) which improves the radio resource utilization efficiency are described in the independent claims. Advantageous embodiments of the mobile station, the access node (e.g., BSS), and the various methods are further described in the dependent claims.

In one aspect, the present disclosure provides a mobile station configured to implement an accelerated system access procedure (ASAP) with an access node (e.g., BSS). The mobile station comprises at least one processor and at least one memory that stores processor-executable instructions, wherein the at least one processor interfaces with the at least one memory to execute the processor-executable instructions, whereby the mobile station is operable to perform a transmit operation and a receive operation. In the transmit operation, the mobile station transmits a packet channel request message to the access node, where the packet channel request message includes a unique identifier (e.g., TLLI) associated with the mobile station. In the receive operation, the mobile station receives an immediate assignment message from the access node, where the immediate assignment message includes the unique identifier (e.g., TLLI) associated with the mobile station. The mobile station being configured to operate in this manner will result in a more efficient utilization of radio resources between the mobile station and the access node (e.g., BSS) since less signaling will be needed between the mobile station and the access node to enable the mobile station to transmit uplink radio blocks when compared to the legacy procedure. Further, the mobile station being configured to operate in this manner will result in the mobile station being able to complete contention resolution immediately (e.g., without delay) after receiving the immediate assignment message including the unique identifier (e.g., TLLI) associated with the mobile station.

In another aspect, the present disclosure provides a method in a mobile station for implementing an accelerated system access procedure (ASAP) with an access node (e.g., BSS). The method comprises a transmitting operation and a receiving operation. In the transmitting operation, the mobile station transmits a packet channel request message to the access node, where the packet channel request message includes a unique identifier (e.g., TLLI) associated with the mobile station. In the receiving operation, the mobile station receives an immediate assignment message from the access node, where the immediate assignment message includes the unique identifier (e.g., TLLI) associated with the mobile station. The method will result in a more efficient utilization of radio resources between the mobile station and the access node (e.g., BSS) since less signaling will be needed between the mobile station and the access node to enable the mobile station to transmit uplink radio blocks when compared to the legacy procedure. Further, the method will result in the mobile station being able to complete contention resolution immediately (e.g., without delay) after receiving the immediate assignment message including the unique identifier (e.g., TLLI) associated with the mobile station.

In yet another aspect, the present disclosure provides an access node (e.g., BSS) configured to implement an accelerated system access procedure (ASAP) with a mobile station. The access node comprises at least one processor and at least one memory that stores processor-executable instructions, wherein the at least one processor interfaces with the at least one memory to execute the processor-executable instructions, whereby the access node is operable to perform a receive operation and a transmit operation. In the receive operation, the access node receives a packet channel request message from the mobile station, where the packet channel request message includes a unique identifier (e.g., TLLI) associated with the mobile station. In the transmit operation, the access node transmits an immediate assignment message to the mobile station, where the immediate assignment message includes the unique identifier (e.g., TLLI) associated with the mobile station. The access node being configured to operate in this manner will result in a more efficient utilization of radio resources between the access node (e.g., BSS) and the mobile station since less signaling will be needed between the access node (e.g., BSS) and the mobile station to enable the mobile station to transmit uplink radio blocks when compared to the legacy procedure. Further, the access node being configured to operate in this manner will result in the access node being able to complete contention resolution immediately (e.g., without delay) after receiving the packet channel request message including the unique identifier (e.g., TLLI) associated with the mobile station.

In still yet another aspect, the present disclosure provides a method in an access node (e.g., BSS) for implementing an accelerated system access procedure (ASAP) with a mobile station. The method comprises a receiving operation and a transmitting operation. In the receiving operation, the access node receives a packet channel request message from the mobile station, where the packet channel request message includes a unique identifier (e.g., TLLI) associated with the mobile station. In the transmitting operation, the access node transmits an immediate assignment message to the mobile station, where the immediate assignment message includes the unique identifier (e.g., TLLI) associated with the mobile station. The method will result in a more efficient utilization of radio resources between the access node (e.g., BSS) and the mobile station since less signaling will be needed between the access node (e.g., BSS) and the mobile station to enable the mobile station to transmit uplink radio blocks when compared to the legacy procedure. Further, the method will result in the access node being able to complete contention resolution immediately (e.g., without delay) after receiving the packet channel request message including the unique identifier (e.g., TLLI) associated with the mobile station.

Additional aspects of the invention will be set forth, in part, in the detailed description, figures and any claims which follow, and in part will be derived from the detailed description, or can be learned by practice of the invention. It is to be understood that both the foregoing general description and the following detailed description are exemplary and explanatory only and are not restrictive of the invention as disclosed.

BRIEF DESCRIPTION OF THE DRAWINGS

A more complete understanding of the present invention may be obtained by reference to the following detailed description when taken in conjunction with the accompanying drawings.

DETAILED DESCRIPTION

Figure 1:
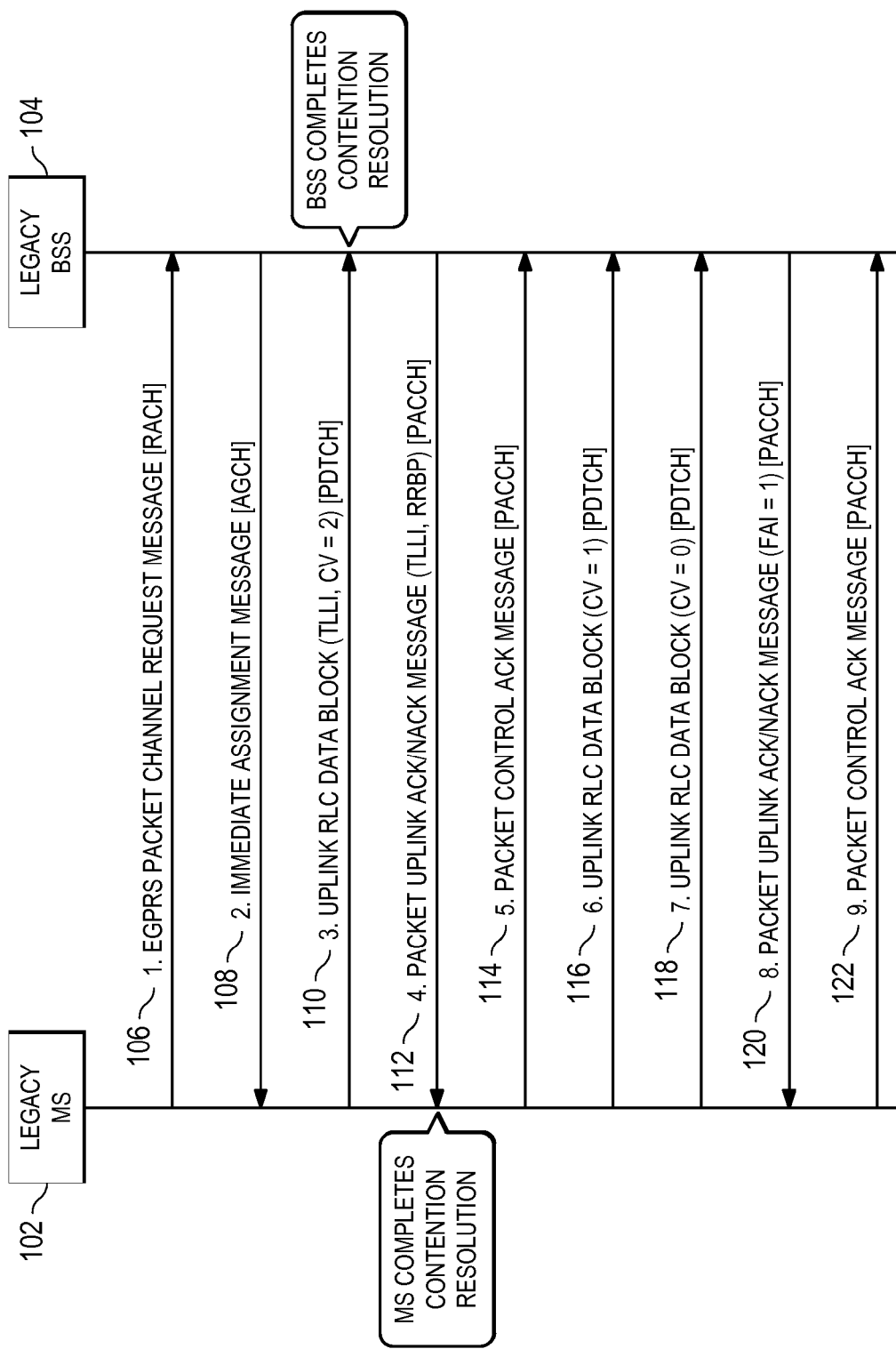
FIG. 1 (PRIOR ART) is a diagram of a legacy signaling procedure associated with a legacy one phase access procedure, required by 3GPP TS 44.060 V.11.7.0, between a legacy mobile station and a legacy access node (e.g., legacy BSS)

To describe the technical features of the present disclosure, a detailed discussion is provided first to explain the main features of an inventive Accelerated System Access Procedure (ASAP) which improves the radio resource utilization efficiency by having: (1) the mobile station transmit a packet channel request to the access node (e.g., BSS), where the packet channel request includes a unique identifier (e.g., TLLI) associated with the mobile station, and (2) the access node after receiving the packet channel request transmits an Immediate Assignment (IA) message to the mobile station, where the IA message includes the unique identifier (e.g., TLLI) associated with the mobile station. Then, a discussion is provided to explain a detailed use case scenario where a traditional mobile station and a traditional access node (e.g., traditional BSS) implementing the legacy procedure is compared to a mobile station and an access node (e.g., BSS) implementing the ASAP in accordance with the present disclosure (e.g., as described with reference to FIGS. 1-2). Finally, a discussion is provided to describe how the mobile station and the access node (e.g., BSS) each implement the ASAP in accordance with the present disclosure (e.g., as described with reference to FIGS. 3-5). Although the ASAP is described herein based on a wireless telecommunication system configured in accordance with the GERAN standards, it should be appreciated that the ASAP may be implemented in any wireless telecommunication system that has a system access procedure between a mobile station and an access node which entails the sending of a packet channel request (or an equivalent thereof) and the assignment of uplink radio resources.

Introduction: Accelerated System Access Procedure (ASAP)

The present disclosure describes a new procedure referred to herein as the Accelerated System Access Procedure (ASAP) which effectively improves the radio resource utilization efficiency by having: (1) a mobile station transmit an access burst using a normal burst structure in the form of an enhanced packet channel request message; and (2) an access node (e.g., BSS) transmit an enhanced Immediate Assignment message. The use of a normal burst structure on the RACH channel allows the mobile station to transmit an enhanced packet channel request message that includes a larger volume of payload information which includes at least a 32 bit TLLI of the mobile station that allows for faster contention resolution when compared to legacy procedures. The ability to define a RACH access burst (e.g., enhanced packet channel request message) that includes more than the current maximum of 11 bits of payload information is possible in light of, for instance, (a) wireless devices which may have limited mobility or no mobility which allows them to apply a so-called Timing Advance (e.g., acquired during a previous communication with the BSS but that is still valid due to the limited mobility of the wireless devices) to the wireless devices' transmissions to avoid inter-timeslot interference despite the short guard period of the normal burst, or (b) any type of wireless device that operates within GSM deployments with limited cell size (e.g., up to a few kilometers), in which case a zero Timing Advance can be used without inter-timeslot interference due to the limited propagation delay.

Currently, in legacy networks, short random access bursts with a large guard period are used due to the propagation delay over "the air," which increases with the distance between the wireless device and the access node. In the case of (a) above where ASAP is implemented, it may be assumed that the wireless device knows the amount of propagation delay from a previous transfer, in which the access node (e.g., BSS) has signaled the correct Timing Advance to the wireless device. Since the wireless device is stationary or almost stationary, the wireless device can then assume that the propagation delay has not changed since the last transfer of the Timing Advance, even if the serving cell is not small (e.g., where a small cell is limited to a radius of a few kilometers). In the case of (b) above with ASAP, the propagation delay is so small (i.e., because the distance between the wireless device and the access node is small in the cell with limited size) that the propagation delay can be assumed to be zero. When system information indicates that the serving cell is small, this implicitly indicates that the access node (e.g., BSS) supports ASAP, e.g., by supporting reception of packet channel request messages that include a unique identifier associated with the accessing wireless device.

The net impact of this new ASAP is an improved packet data channel (PDCH) utilization that is realized due to (a) an accelerated contention resolution process that needs only a RACH (random access channel)—AGCH (access grant channel) exchange, thereby eliminating the legacy Packet Uplink Ack/Nack—Packet Control Ack message exchange currently performed in support of contention resolution, and (b) an accelerated process for providing the BSS with specific capability information of the mobile station and with knowledge of the nature of an access request (e.g., enhanced packet channel request message), thereby allowing the BSS to transmit a corresponding immediate assignment message with enhanced content (e.g., the mobile station's 32 bit TLLI) on the AGCH to the mobile station.

Detailed Use Case Scenario

One use case described herein involves a mobile station that has limited mobility or no mobility, such as a MTC device, where the expected high volume of MTC devices being served by a specific cell and their associated small data transmissions (SDTs) drives an interest in making the MTC devices as efficient as possible with regards to their use of PDCH resources. The ASAP effectively improves PDCH resources efficiency as discussed below with respect to FIG. 1 (PRIOR ART) and FIG. 2.

Referring to FIG. 1 (PRIOR ART), there is a diagram of a legacy signaling procedure associated with a one phase access procedure as required by 3GPP TS 44.060 V.11.7.0 (the contents of which are hereby incorporated herein by reference) between a legacy mobile station 102 (e.g., legacy MTC device 102) and a legacy access node 104 (e.g., legacy BSS 104). In this exemplary diagram, the legacy mobile station 102 and legacy BSS 104 interact with one another such that the legacy mobile station 102 can transmit three RLC data blocks (for example) to the legacy BSS 104 as follows:

1. The legacy mobile station 102 transmits an EGPRS packet channel request message 106 on the RACH to the legacy BSS 104. It is to be noted that the EGPRS packet channel request message 106 is configured per 3GPP TS 44.060 V.11.7.0.

2. The legacy BSS 104 transmits an immediate assignment message 108 on the AGCH to the legacy mobile station 102.

3. The legacy mobile station 102 transmits an uplink RLC data block 110 (comprising a TLLI and CV=2) on the PDTCH to the legacy BSS 104. The legacy BSS 104, after receiving the uplink RLC data block 110, completes contention resolution (i.e., the legacy BSS 104 determines the TLLI of the legacy mobile station 102 that has won the contention access).

4. The legacy BSS 104 transmits a packet uplink ack/nack message 112 (comprising the TTLI and a RRBP) on the PACCH to the legacy mobile station 102. The legacy mobile station 102, after receiving the packet uplink ack/nack message 112, completes contention resolution (i.e., the legacy mobile station 102 determines that its uplink RLC data block 110 was captured by the legacy BSS 104 and hence determines that it has won the contention access).

5. The legacy mobile station 102 transmits a packet control ack message 114 on the PACCH to the legacy BSS 104. The legacy mobile station 102 transmits the packet control ack message 114 to confirm reception of the packet uplink ack/nack message 112.

6. The legacy mobile station 102 transmits a second uplink RLC data block 116 (comprising CV=1) on the PDTCH to the legacy BSS 104.

7. The legacy mobile station 102 transmits a third uplink RLC data block 118 (comprising CV=0) on the PDTCH to the legacy BSS 104.

8. The legacy BSS 104 transmits a packet uplink ack/nack message 120 (comprising FAI=1) on the PACCH to the legacy mobile station 102.

9. The legacy mobile station 102 transmits a packet control ack message 122 on the PACCH to the legacy BSS 104.

The legacy one phase access procedure has a negative impact on the PDCH utilization for user plane payload transmission purposes (e.g., legacy mobile station 102 transmitting uplink data) due to at least the following:

The legacy mobile station 102 must include 4 octets of TLLI information (and a corresponding overhead octet to indicate the presence of TLLI information) in at least the first RLC data block 110 that the legacy mobile station 102 transmits to the legacy BSS 104 (step 3) so that contention resolution can be completed from the legacy BSS 104 perspective as soon as possible. This results in 5 octets of payload transmission space being lost due to TLLI inclusion.

The legacy BSS 104 must transmit a Packet Uplink Ack/Nack message 112 (including the TLLI of the legacy mobile station 102) as soon as possible (step 4) so that contention resolution can be completed from the legacy mobile station 102 perspective as soon as possible. Considering that a small data transmission (e.g., 3 RLC data blocks 110, 116 and 118 as per the example of FIG. 1) could easily be managed with the transmission of a single Packet Uplink Ack/Nack message 120 on the downlink PACCH (as per step 8), the transmission in step 4 is costly in that it eliminates the possibility of using that radio block for a downlink payload transmission (i.e., RLC data block transmission) to the same or another legacy mobile station 102 due to the need for fast contention resolution.

The legacy mobile station 102 must transmit a Packet Control Ack message 114 (step 5) to confirm the reception of the Packet Uplink Ack/Nack message 112 on the uplink PACCH. The legacy mobile station 102's confirmation of reception of the Packet Uplink Ack/Nack message 112 is costly in that it eliminates the possibility of using that radio block for uplink payload transmission, (i.e., RLC data block transmission) and instead increases the control signaling overhead.

Due to the non-zero round-trip time of the RLC/MAC protocol on the radio interface, the TLLI information may in practice be included in more than one RLC data block before the first Packet Uplink Ack/Nack message is received by the legacy mobile station 102, which would result in additional payload transmission space being lost (this case is not illustrated in FIG. 1 (PRIOR ART)).

Figure 2:
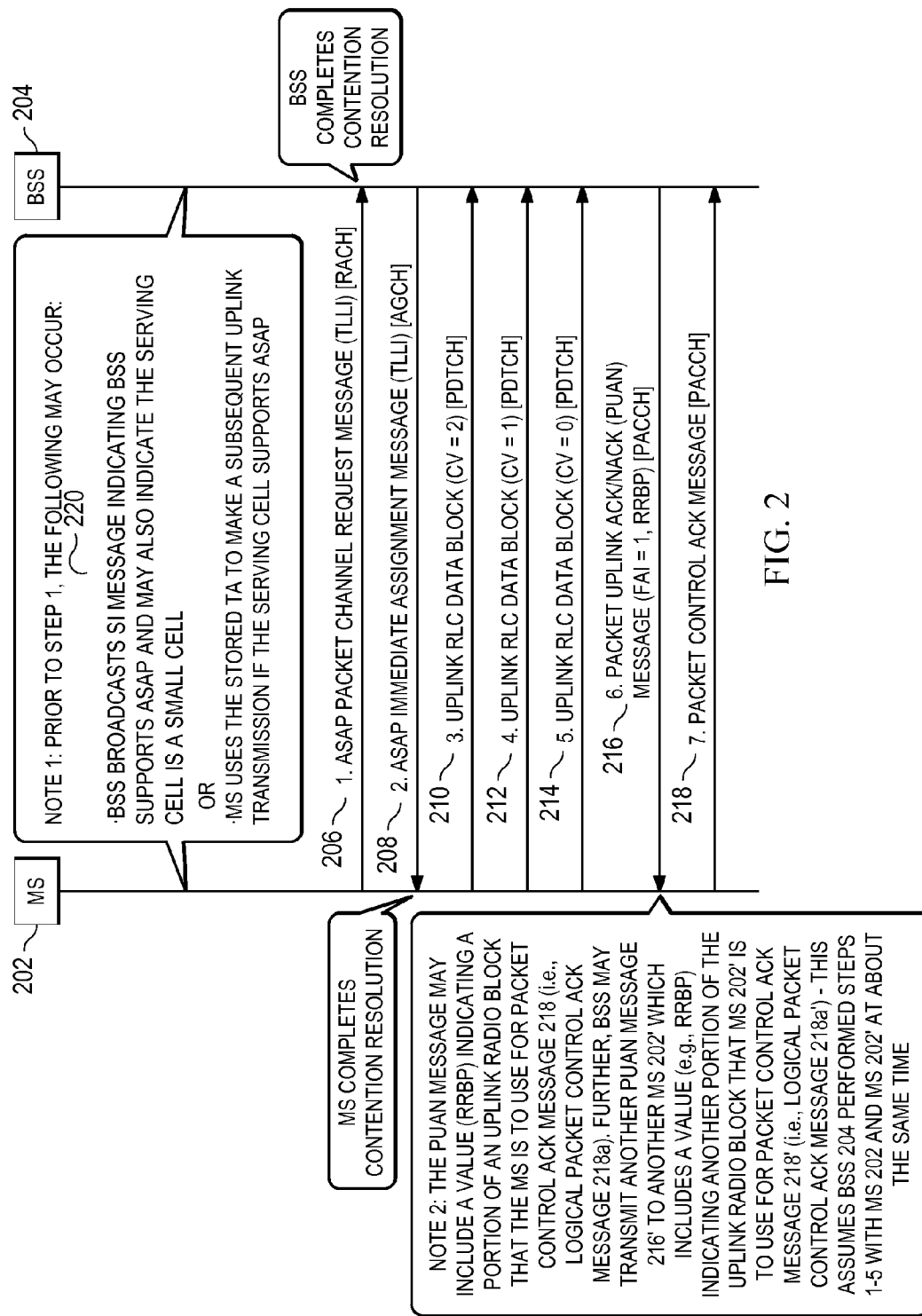
FIG. 2 is a diagram of the ASAP signaling procedure associated with the new one phase access procedure between a mobile station (e.g., MTC device) and an access node (e.g., BSS) in accordance with an embodiment of the present disclosure.

Referring to FIG. 2, there is a diagram of the ASAP signaling procedure associated with the new one phase access procedure between a mobile station 202 (e.g., MTC device 202) and an access node 204 (e.g., BSS 204) in accordance with an embodiment of the present disclosure. In this exemplary diagram, the mobile station 202 and the BSS 204 interact with one another such that the mobile station 202 can transmit three RLC data blocks 210, 212 and 214 (for example) to the BSS 204 per the new one phase access procedure (ASAP) as follows:

1. The mobile station 202 transmits an ASAP packet channel request message 206 (comprising a TLLI of the mobile station 202) on the RACH to the BSS 204. The BSS 204, after receiving the ASAP packet channel request message 206 (also referred to herein as the enhanced packet channel request message 206 or the packet channel request message 206), completes contention resolution (i.e., the BSS 204 determines the identity (e.g., TLLI) of the mobile station 202 that has won the contention access).

2. The BSS 204 transmits an ASAP immediate assignment message 208 (comprising the TLLI of the mobile station 202) on the AGCH to the mobile station 202. The mobile station 202, after receiving the ASAP immediate assignment message 208 (also referred to herein as the enhanced immediate assignment message 208 or the immediate assignment message 208), completes contention resolution (i.e., the mobile station 202 determines that the mobile station's 202 ASAP packet channel request message 206 was captured by the BSS 204).

3. The mobile station 202 transmits an uplink RLC data block 210 (comprising CV=2) on the PDTCH to the BSS 204.

4. The mobile station 202 transmits a second uplink RLC data block 212 (comprising CV=1) on the PDTCH to the BSS 204.

5. The mobile station 202 transmits a third uplink RLC data block 214 (comprising CV=0) on the PDTCH to the BSS 204.

6. The BSS 204 transmits a packet uplink ack/nack message 216 (comprising FAI=1 and a RRBP field) on the PACCH to the mobile station 202.

7. The mobile station 202 transmits a packet control ack message 218 on the PACCH to the BSS 204.

Note 1: Prior to step 1, the following may occur: (1) the BSS 204 broadcasts a System Information (SI) message 220 indicating that the BSS 204 supports ASAP and possibly indicating that the serving cell is a small cell (i.e., having a limited cell size with a radius of a few kilometers, for example); or (2) the mobile station 202 stores the Timing Advance (TA) used for a previous channel request message and uses the stored TA to make a subsequent uplink transmission (e.g., packet channel request message 206) if the serving cell supports ASAP. It should be noted that if the SI message 220 does indicate that the serving cell is a "small cell," this could implicitly mean that the serving cell (e.g., BSS 204) supports ASAP. Otherwise (i.e., the SI message 220 does not indicate that the serving cell is a small cell), the mobile station 202 may read another flag in the SI message 220 to determine if the serving cell (e.g., BSS 204) supports ASAP. In fact, if the SI message 220 has the "small cell" flag set, this would allow the mobile station 202 to avoid having to retain knowledge of or to store the TA used for an uplink transmission made in the serving cell.

Note 2: The Packet Uplink Ack/Nack message 216 (PUAN message 216) may include a value (e.g., RRBP) indicating a portion of an uplink radio block that the mobile station 202 is to use for the Packet Control Ack message 218 (i.e., logical Packet Control Ack message 218*a*). Further, the BSS 204 may transmit to another mobile station 202' another PUAN message 216' which includes a value (e.g., RRBP) indicating another portion of the same uplink radio block that the mobile station 202' is to use for its Packet Control Ack message 218' (i.e., logical Packet Control Ack message 218*a'*)—this assumes the BSS 204 performed steps 1-5, and in particular step 5, at about the same time with the mobile stations 202 and 202'. This unique use of PUAN messages 216 and 216' which include different values (e.g., RRBPs) and are sent to mobile stations 202 and 202', respectively, to trigger the mobile stations 202 and 202' to transmit their logical Packet Control Ack messages 218*a* and 218*a'*, respectively, using the same uplink radio block is discussed in more detail below.

The new one phase access procedure (ASAP) shown in FIG. 2 improves the PDCH utilization efficiency by: (1) the mobile station 202 transmitting an enhanced packet channel request message 206 (access request message 206) which includes the 32 bit TLLI of the mobile station 202 on the RACH to the BSS 204 (see 3GPP TS 23.003 V.11.7.0, the contents of which are hereby incorporated herein by reference, for a discussion about the determination of the TLLI); and (2) the BSS 204 transmitting an enhanced IA message 208 which includes the TLLI previously received on the RACH to the mobile station 202 on the AGCH. The net result of this new one phase access procedure (ASAP) is shown in FIG. 2, where it can be seen that the BSS 204 completes contention resolution at step 1, the mobile station 202 completes contention resolution at step 2, and all of the negative impacts on PDCH utilization listed above relative to the legacy one phase access procedure are eliminated. The mobile station 202 is able to make use of this new one phase access procedure (ASAP) when the mobile station 202 has been assigned a P-TMSI (from which its TLLI is derived), since the identity included in the packet channel request message 206 (access request message 206) (step 1) needs to be unique to the mobile station 202 for contention resolution purposes. In this regard, the mobile station 202 is assigned a P-TMSI as follows during the GPRS Attach procedures, e.g., as discussed in 3GPP TS 23.060 V11.8.0, the contents of which are hereby incorporated herein by reference.

As indicated in note 2, the new one phase access procedure (ASAP) shown in FIG. 2 can be further improved by having the Packet Control Ack Message 218 of step 7 be sent using only a portion of the uplink radio block indicated by the RRBP field of the PUAN message 216 of step 6. If this improvement is used then the Packet Control Ack message 218 is referred to herein as the logical Packet Control Ack message 218a'. For example, assume two different mobile stations 202 and 202' (e.g., MTC devices 202 and 202') have completed their respective uplink small data transmissions at about the same time and can send their respective PUAN messages 216 and 216' in step 6, each with different RRBP values that indicate the same uplink radio block for transmitting their respective logical Packet Control Ack Messages 218a and 218a'. In this case, the content of their respective PUAN messages 216 and 216', and in particular the value in the RRBP field within the RLC/MAC control block header associated with their respective PUAN messages 216 and 216', can be modified to indicate which portion of the uplink radio block of step 7 that the respective mobile stations 202 and 202' (e.g., MTC devices 202 and 202') are to use to transmit their respective logical Packet Control Ack messages 218a and 218a' in step 7 (i.e., the use of a full uplink radio block is not efficient when the mobile station 202 only needs to confirm the simple reception of the PUAN message 216 of step 6, and so an abbreviated Packet Control Ack message 218 referred to herein as the logical Packet Control Ack message 218a can be sent using half the symbol space normally used for step 7). These logical Packet Control Ack messages 218a and 218a' could be considered PACCH messages supporting about half the payload space associated with a legacy PACCH message. If four mobile stations 202, 202', 202" and 202'" (for example) were to share a common uplink radio block when transmitting their respective logical Packet Control Ack messages 218a, 218a', 218a" and 218a'", then each of these messages could be considered a PACCH message which supports about ¼ (for example) of the payload space associated with a single legacy PACCH message. This method of transmitting logical Packet Control Acks messages 218a and 218a' etc . . . will result in an improved PDCH utilization for the uplink and a further reduction in power consumption at the mobile stations 202 and 202' etc. . . . Two possible ways one can use to implement this particular improvement are provided in the following co-assigned patent applications: (1) U.S. Pat. No. 8,374,133 entitled "Shared Uplink Notification Bursts (SUNB)," which provides a description of how multiple mobile stations can share the bursts comprising an uplink radio block by providing a simple Boolean indicator (such as would be needed to trigger the logical Packet Control Ack messages 218a and 218a' in the present disclosure) unique to each of the sharing mobile stations (i.e., wireless devices); and (2) U.S. Patent Publication No. 2013/0272273 A1 entitled "Methods and Devices for Transmissions of Signals in a Telecommunication System," which describes an orthogonal shared UL channel within a GSM channel bandwidth, which is one possible way to implement the shared notification bursts described in the present disclosure. The entire contents of these two documents are hereby incorporated herein by reference for all purposes.

TABLE #1 compares the legacy one phase access procedure with the new one phase access procedure (ASAP) in terms of actual mobile station transmission time and reception time using MCS-1 (modulation and coding scheme 1, which provides for 22 bytes of payload per radio block) for the PDTCH and assuming the mobile stations 102 and 202 need to transmit a total of 20 bytes of payload. The significantly reduced transmission and reception times of the new one phase access procedure (ASAP) results in the mobile station 202 having a substantial power reduction advantage for small data transmissions when compared to the legacy mobile station 102, which implements the legacy one phase access procedure.

TABLE #1

| Type of Access | Transmission time | Reception time |
| --- | --- | --- |
| Legacy one phase access procedure | 1 access burst (RACH) + 2 radio blocks* (PDTCH) + 2 radio blocks (PACCH) 9.07 ms | 1 radio block (AGCH) + 2 radio block (PACCH) 6.56 ms |
| New one phase access procedure (ASAP) | 1 normal burst (RACH) + 1 radio block (PDTCH) + 1 radio block (PACCH) 4.92 ms | 1 radio block (AGCH) + 1 radio block (PACCH) 4.37 ms |
| Improvement | −46% | −33% |

*Each radio block carries 22 bytes, but since TLLI is 4 bytes and 1 byte of overhead is needed to indicate the inclusion of TLLI in a radio block, only 17 bytes can fit within the first radio block and a total of two blocks needs to be transmitted.

The legacy access burst (e.g., EGPRS packet channel request message 106) sent on the RACH consists of the fields shown in TABLE #2 below, wherein the 36 encrypted bits (e0 . . . e35) include 8 or 11 bits of payload information.

TABLE #2

Legacy RACH Burst Fields
(see sub-clause 5.2.7 in 3GPP TS 45.002 V11.3.0)

| Bit Number (BN) | Length of field | Contents of field | Definition |
| --- | --- | --- | --- |
| 0-7 | 8 | extended tail bits | (below) |
| 8-48 | 41 | synchronization sequence bits | (below) |
| 49-84 | 36 | encrypted bits (e0 . . . e35) | 3GPP TS 45.003 V11.1.0 |
| 85-87 | 3 | tail bits | (below) |
| 88-156 | 68, 25 | extended guard period (bits) | 3GPP TS 45.003 V11.1.0 subclause 5.2.8 |

The entire contents of 3GPP TS 45.002 V11.3.0 and 3GPP TS 45.003 V11.1.0 are hereby incorporated herein by reference for all purposes.

For the case of 8 payload bits, the encrypted bits are constructed by appending 6 parity bits for error detection and 4 tail bits for the convolutional encoder. This results in 18 bits that are encoded using a rate 1/2 convolutional code to 36 bits. A similar procedure is followed with the 11 bit access burst.

In the legacy one phase access procedure, the access burst (e.g., EGPRS packet channel request message 106) is transmitted from the legacy mobile station 102 without any timing advance (TA). It is to be noted that this is not necessarily the case in one feature of the present disclosure, as discussed below with reference to TABLE#3. For some background with regards to TA, transmissions with a timing advance are generally used to ensure that the legacy BSS 104 can expect the transmitted burst in a certain time window irrespective of the position of the legacy mobile station 102 relative to the antenna of the legacy BSS 104, which also effectively avoids any inter-timeslot interference (i.e., bursts interfering in time). The time offset, relative to the timeslot structure, of received bursts transmitted without a TA can be estimated by the legacy BSS 104 based on a received access burst (e.g., EGPRS packet channel request message 106), which is currently transmitted without TA, and the TA needed to compensate for this time offset is communicated in an Immediate Assignment message 108 to the legacy mobile station 102, in order for the legacy mobile station 102 to transmit with TA for subsequent transmissions.

However, in the present disclosure, the mobile station 202 (e.g., MTC device 202), which is expected to have a low or no mobility attribute, will experience the same TA or a similar TA for every access request message (packet channel request message 206) that the mobile station 202 transmits within its serving cell to the BSS 204. In this situation, the mobile station 202 (e.g., MTC device 202) can store the TA used for a previous access request and use this stored TA to determine if the mobile station 202 can utilize the new RACH burst format (referred to herein as an ASAP RACH burst, ASAP packet channel request message 206, or enhanced packet channel request message 206), wherein increased payload space will be available. This new RACH burst format (packet channel request message 206) can also be utilized in cells with limited cell size (e.g., a radius of a few kilometers), where it is expected that no TA will be needed for UL transmission. Various other means of storing or retaining knowledge of the needed TA or removing the need for TA may also be possible. For example, the BSS 204 can transmit system information (SI) to indicate when the mobile station 202 need not apply TA to its packet channel request message 206 due to the small size of the serving cell (e.g., a radius of a few kilometers). In addition, the BSS 204 can transmit system information (SI) to indicate when the BSS 204 supports the use of the new one phase access procedure (i.e., ASAP) and can receive the packet channel request message 206 as shown in FIG. 2.

The net result of this knowledge of the previous, needed TA or that the BSS 204 supports the ASAP is that the mobile station 202 (i.e., wireless device 202) can make use of the new RACH burst format (e.g., packet channel request message 206) that allows for a significant reduction in the size of the extended guard period bits (currently 68 bits) and a reduction in the size of the synchronization sequence bits (currently 41 bits) to the extent that a 32-bit TLLI plus, for example, an additional 16 bits of supplementary signaling information can be included within the additional payload space (i.e., a total of 48 bits of payload information in the packet channel request message 206, compared to 8 or 11 bits of payload information currently available in the legacy packet channel request message 106). The robustness of the 48 bits of payload information in the packet channel request message 206 can be ensured by using, for example, a rate 1/2 convolutional coding, as per the field lengths shown in TABLE #3 below, and thereby realize a robustness that is similar to that of the legacy RACH access burst (e.g., legacy packet channel request message 106).

Any burst structure for the packet channel request message 206 can be used that allows an access within the inherent timeslot boundaries. For a straight-forward and backwards compatible solution, the new RACH burst format (e.g., packet channel request message 206) could make use of the legacy normal burst format (e.g., legacy packet channel request message 106), which includes 116 encrypted bits ((48+6 (parity)+4 (tail))*2=116). In this case, the new RACH burst (e.g., packet channel request message 206) could, for example, have a format as shown in TABLE #3.

TABLE #3

ASAP RACH Burst Fields using normal burst
(see sub-clause 5.2.3 in 3GPP TS 45.002 V11.3.0)

| Bit Number (BN) | Length of field | Contents of field | Definition |
| --- | --- | --- | --- |
| 0-2 | 3 | tail bits | (below) |
| 3-60 | 58 | encrypted bits (e0 . . . e57) | 3GPP TS 45.003 V11.1.0 |
| 61-86 | 26 | training sequence bits | (below) |
| 87-144 | 58 | encrypted bits (e58 . . . e115) | 3GPP TS 45.003 V11.1.0 |
| 145-147 | 3 | tail bits | (below) |
| 148-156 | 8, 25 | guard period (bits) | 3GPP TS 45.003 V11.1.0 subclause 5.2.8 |

In one example, the new one phase access procedure (ASAP) calls for the use of a normal burst structure on the RACH channel as shown in TABLE #3. This allows the mobile station 202 (i.e., wireless device 202) to include a larger volume of payload information in an ASAP packet channel request message 206 which, in addition to a 32 bit TLLI field, may include 16 bits of supplementary signaling information. It should be noted that the TLLI can be substituted by any other type of identifier that uniquely identifies the mobile station 202 in a given service area, such as a BSC area, cell, routing area or any equivalent thereof. The enhanced immediate assignment message 208 (also referred to herein as an ASAP immediate assignment message 208) is needed to allow the network (e.g., an access node such as BSS 204) to send additional information (e.g., the mobile station's TLLI) to the mobile station 202 to take full advantage of the payload information carried within the ASAP packet channel request message 206. The ASAP packet channel request message 206 can comprise a combination of, but is not limited to, any of the following:

The size of uplink payload to be transferred:
  This would allow the network (e.g., an access node such as BSS 204) to assign resources in a more efficient way.
Downlink/Uplink biasing:
  For example, if the ASAP packet channel request message 206 indicates a downlink biased service is requested, then the ASAP immediate assignment message 208 can assign 4 timeslots on the downlink and 1 timeslot on the uplink for the mobile station 202 that supports multislot class 12. For example, this feature could be used in the downloading of a picture. For this and other purposes, the BSS 204 could define, for example, several types of pre-set profiles of the data transfer, e.g., TBF type 1, TBF type 2, etc., and indicate the profile to be used, and hence the corresponding resource assignment, in the ASAP immediate assignment message 208. Here, each TBF type represents or indicates a given number of timeslots in the uplink and downlink direction assigned to the mobile station 202.

The transport protocol used (e.g., TCP or UDP):
    This would allow the network (e.g., an access node such as BSS 204) to assign resources in a more efficient way, e.g., by setting up a TBF for both the uplink and downlink directions to accommodate the transport of both TCP payload and TCP acknowledgements.
The application type, such as IM chat, streaming, posting a message, reading a message, keep-alive, etc. . . .
    This allows the network (e.g., an access node such as BSS 204) to optimize the resource utilization by, e.g., setting an appropriate scheduling priority for a given application type.
Coverage requirement estimate (e.g., coverage class):
    In a case with stationary or almost stationary mobile station 202, the mobile station 202 might need good coverage (e.g., the mobile station 202 is placed in a basement) and hence, it would be beneficial for the network (e.g., an access node such as BSS 204) to understand this as soon as possible in order to allocate sufficient resources to reach the mobile station 202. A coverage class could be defined by the received signal strength at the mobile station 202, and hence the mobile station 202 can indicate this to the network (e.g., an access node such as BSS 204) by transmitting an access request (e.g., the ASAP packet channel request message 206), which includes information that indicates a coverage class.
The TA value used by the mobile station 202:
    If a low mobility mobile station 202 with a slowly drifting propagation delay is allowed to reuse the TA stored from a previous uplink TBF, the network (e.g., an access node such as BSS 204) can use this information to adjust the TA of the new uplink TBF, which is established using the new one phase access procedure (ASAP).
Access Priority:
    This can help the network (e.g., an access node such as BSS 204) to better prioritize the assignment of resources should resource availability become an issue under load.
Multislot Class:
    This helps the network (e.g., an access node such as BSS 204) to determine the quantity of uplink and downlink timeslots that can be assigned to the mobile station 202.
Received Signal Strength Indicator (RSSI) and payload size:
    The network (e.g., an access node such as BSS 204) can use this information to schedule more appropriate MCSs for UL data to be sent from the mobile station 202, thereby effectively reducing the number of radio blocks 210, 212 and 214 needed for transmission.
Mobility Factor:
    A "no mobility" indication can, for example, mean that the mobile station 202 has detected the same BSIC for its neighbor cells and a constant RSSI (or within small variations) for these same neighbor cells since the mobile station 202's last uplink transmission.
    A "no mobility" indication combined with the mobile station 202 indicating the MCS used during the mobile station 202's last uplink transmission can provide the network (e.g., an access node such as BSS 204) with an improved ability to determine an optimum MCS to be used on the uplink and downlink resources that the network assigns.

Figure 3:
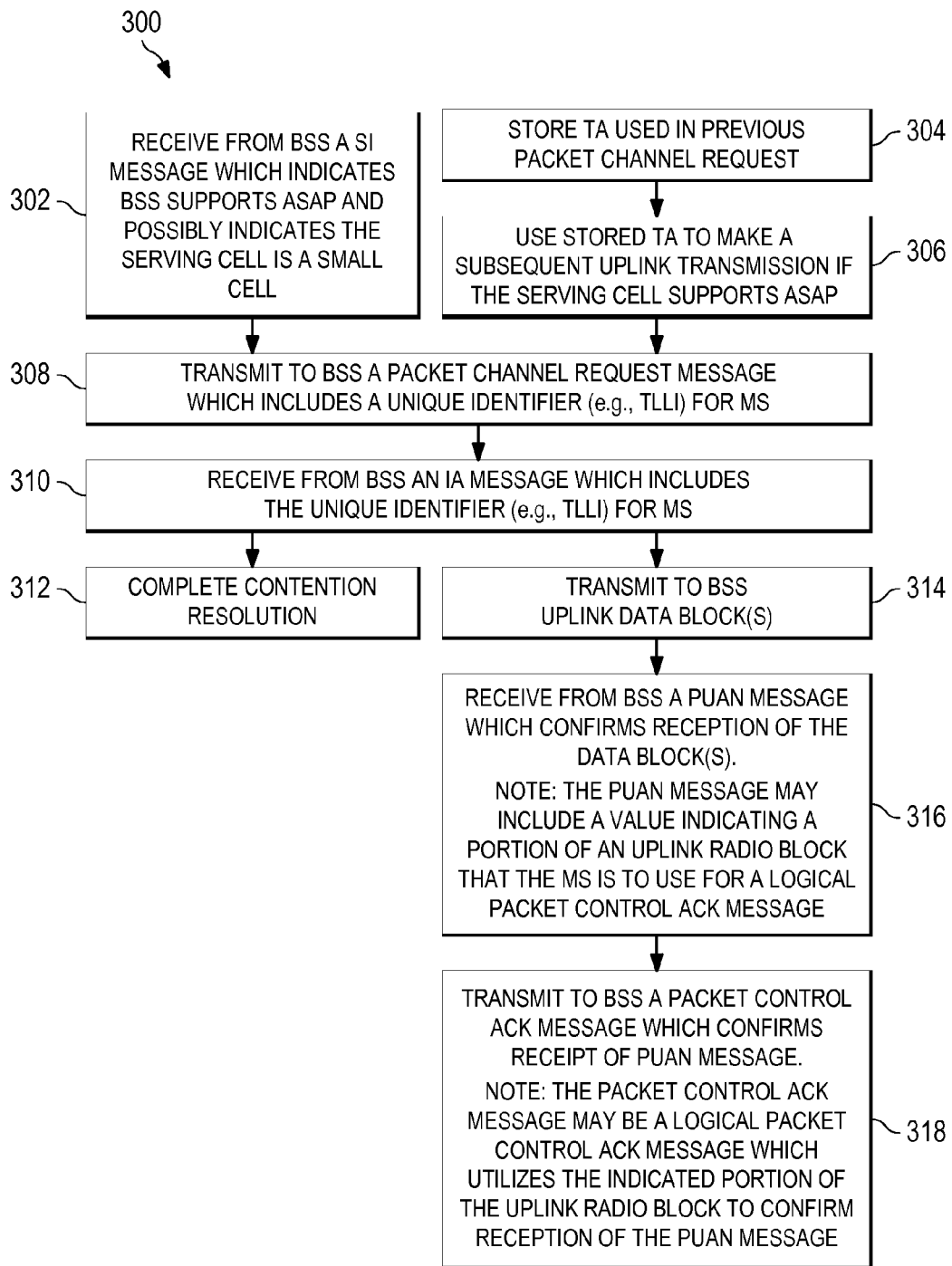
FIG. 3 is a flowchart of a method in the mobile station for implementing the ASAP with the access node (e.g., BSS) in accordance with an embodiment of the present disclosure.

Referring to FIG. 3, there is a flowchart of a method 300 in the mobile station 202 for implementing the ASAP with the access node 204 (e.g., BSS 204) in accordance with an embodiment of the present disclosure. At step 302, the mobile station 202 receives a system information message 220 from the BSS 204, where the system information message 220 indicates that the BSS 204 supports the ASAP (e.g., as illustrated in Note 1 of FIG. 2) and the serving cell is a small cell (i.e., of limited cell size, such as a cell having a radius of a few kilometers), and concludes that the mobile station 202 can use the ASAP. Alternatively, if the system information message 220 indicates that the BSS 204 supports the ASAP but does not indicate that the serving cell is a small cell (i.e., of limited cell size, such as a cell having a radius of a few kilometers), the mobile station 202 can, at step 304, store a TA that was used for a previous packet channel request message and can use the stored TA at step 306 to make a subsequent uplink transmission (e.g., packet channel request message 206) if the serving cell supports ASAP (e.g., as illustrated in Note 1 of FIG. 2). After step 302 or steps 304 and 306, the mobile station 202 at step 308 transmits the packet channel request message 206 to the BSS 204, where the packet channel request message 206 includes the unique identifier (e.g., TLLI) associated with the mobile station 202 (e.g., as illustrated in step 1 of FIG. 2). In one example, the unique identifier is the mobile station's TLLI, which is based on a pre-assigned P-TMSI. At step 310, the mobile station 202 receives the immediate assignment message 208 from the BSS 204, where the immediate assignment message 208 includes the mobile station's unique identifier (i.e., the same identifier that the mobile station 202 included in the packet channel request message 206) associated with the mobile station 202 (e.g., as illustrated in step 2 of FIG. 2). At step 312, the mobile station 202, upon receiving the immediate assignment message 208, completes contention resolution (e.g., as illustrated in step 2 of FIG. 2). At step 314, the mobile station 202, upon receiving the immediate assignment message 208, which includes the unique identifier (e.g., TLLI), transmits to the BSS 204 one or more uplink data blocks 210, 212, 214 (e.g., as illustrated in steps 3-5 of FIG. 2). At step 316, the mobile station 202 receives the PUAN message 216 from the BSS 204, where the PUAN message 216 confirms the reception by the BSS 204 of the one or more uplink data blocks 210, 212, 214 (e.g., as illustrated in step 6 of FIG. 2). At step 318, the mobile station 202 transmits the packet control ack message 218 to the BSS 204, where the packet control ack message 218 confirms the reception of the PUAN message 216. As an additional feature of the present disclosure, the mobile station 202 at step 316 may receive the PUAN message 216 which also includes a value (e.g., RRBP value) that indicates a portion of an uplink radio block to be used by the mobile station 202 for transmitting the packet control ack message 218 (referred to herein as the logical packet control ack message 218a) to confirm the reception of the PUAN message 216. Then, the mobile station 202 at step 318 would transmit the packet control ack message 218 (referred to herein as the logical packet control ack message 218a) utilizing the indicated portion of the uplink radio block to confirm the reception by the mobile station 202 of the PUAN message 216 (e.g., as illustrated in step 7 of FIG. 2).

Figure 4:
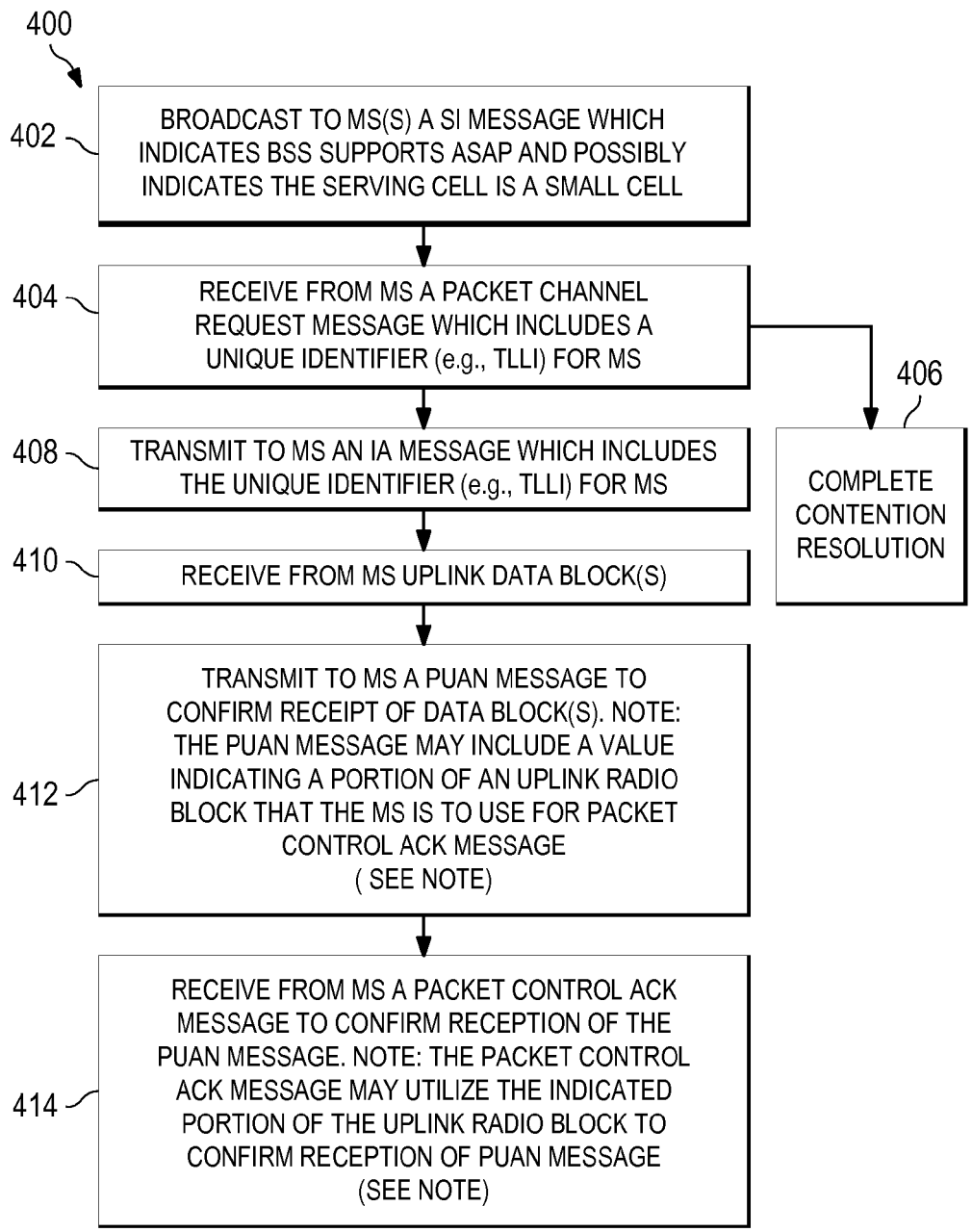
FIG. 4 is a flowchart of a method in the access node (e.g., BSS) for implementing the ASAP with the mobile station (e.g., MTC device) in accordance with an embodiment of the present disclosure; and, FIG. 5 is a schematic view of the mobile station and the access node (e.g., BSS), which are configured to implement the ASAP and the various methods in accordance with different embodiments of the present disclosure.

Referring to FIG. 4, there is a flowchart of a method 400 in the access node 204 (e.g., BSS 204) for implementing the ASAP with the mobile station 202 in accordance with an embodiment of the present disclosure. In some embodiments, at step 402, the BSS 204 broadcasts the system information message 220 to mobile stations 202, where the system information message 220 indicates that the BSS 204 supports the ASAP and possibly indicates that the serving cell is a small cell (e.g., of limited cell size, such as a cell having a radius of a few kilometers) (e.g., as illustrated in Note 1 of FIG. 2). At step 404, the BSS 204 receives the packet channel request message 206 from the mobile station 202, where the packet channel request message 206 includes the unique identifier (e.g., TLLI) associated with the mobile station 202 (e.g., as illustrated in step 1 of FIG. 2). In one example, the unique identifier is the mobile station's TLLI, which is based on a pre-assigned P-TMSI. At step 406, the BSS 204, upon receiving the packet channel request message 206, completes contention resolution (e.g., as illustrated in step 2 of FIG. 2). At step 408, the BSS 204 transmits the immediate assignment message 208 to the mobile station 202, where the immediate assignment message 208 includes the unique identifier (e.g., TLLI) associated with the mobile station 202 from which the BSS 204 received the packet channel request message 206 (e.g., as illustrated in step 2 of FIG. 2). At step 410, the BSS 204 receives one or more uplink data blocks 210, 212, 214 from the mobile station 202 (e.g., as illustrated in steps 3-5 of FIG. 2). At step 412, the BSS 204 transmits the PUAN message 216 to the mobile station 202, where the PUAN message 216 confirms the reception of the one or more uplink data blocks 210, 212, 214 (e.g., as illustrated in step 6 of FIG. 2). At step 414, the BSS 204 receives the packet control ack message 218 from the mobile station 202, where the packet control ack message 218 confirms the reception by the mobile station 202 of the PUAN message 216 (e.g., as illustrated in step 6 of FIG. 2).

As an additional feature of the present disclosure, the BSS 204 at step 412 may configure and transmit the PUAN message 216 which also includes a value (e.g., RRBP value) that indicates a portion of an uplink radio block to be used by the mobile station 202 when transmitting the packet control ack message 218 (referred to herein as the logical packet control ack message 218a) to confirm the reception of the PUAN message 216. Then, the BSS 204 at step 414 would receive the packet control ack message 218 (referred to herein as the logical packet control ack message 218a) which utilized the indicated portion of the uplink radio block to confirm the reception by the mobile station 202 of the PUAN message 216 (e.g., as illustrated in step 7 of FIG. 2). Furthermore, if the BSS 204 had performed steps 404, 406, 408, and 410, and in particular step 410, with another mobile station 202' about the same time as steps 404, 406, 408, and 410 were performed with mobile station 202, then the BSS 204 could transmit as step 412' another PUAN message 216' to the mobile station 202', where the PUAN message 216' includes a value (e.g., RRBP) indicating another portion of the uplink radio block (i.e., the same uplink radio block referred to in steps 412 and 414) that the mobile station 202' is to use for its Packet Control Ack message 218' (i.e., logical Packet Control Ack message 218a') (e.g., as discussed in Note 2 of FIG. 2). Thereafter, the BSS 204 at step 414' would receive the packet control ack message 218' (referred to herein as the logical packet control ack message 218a'), which utilized the indicated another portion of the uplink radio block to confirm the reception by the mobile station 202' of the PUAN message 216'. It should be noted that the BSS 204 can implement steps 412' and 414' for multiple mobile stations 202', 202'', 202''', etc., so that the mobile stations will each use a different portion of the same uplink radio block when sending their respective logical Packet Control Ack messages 218a', 218a'', 218a''', etc.

Figure 5:
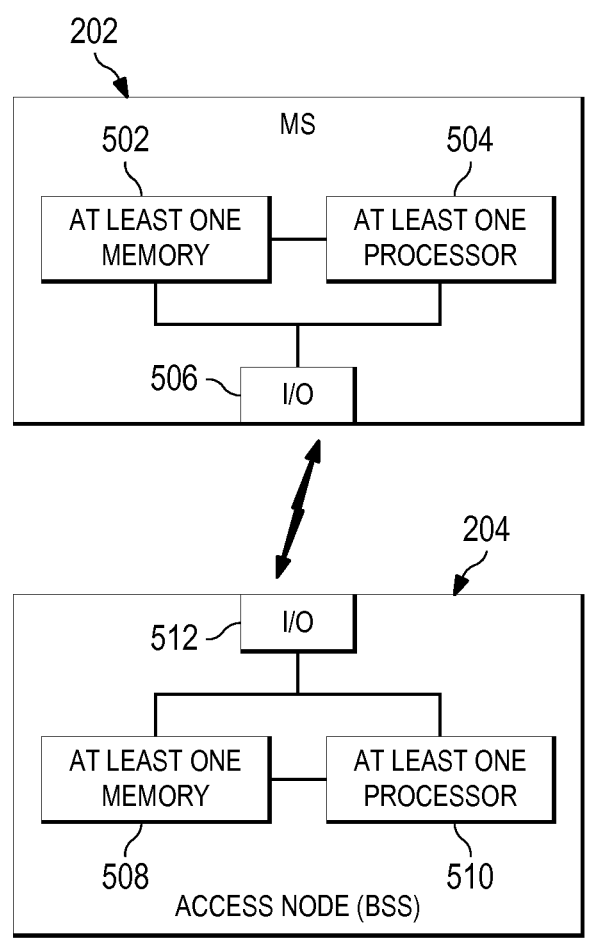

Referring to FIG. 5, there is a schematic view of the mobile station 202 and the access node 204 (e.g., BSS 204) which are configured to implement the ASAP and various methods 300 and 400 in accordance with different embodiments of the present disclosure. The mobile station 202 comprises at least one memory 502, at least one processor 504 for executing instructions stored in the at least one memory 502, and an input/output device 506 for communication with other nodes and devices. The mobile station 202 is in radio connection with the access node 204 (e.g., BSS 204) which comprises at least one memory 508, at least one processor 510 suitable for executing instructions stored in the at least one memory 508 as well as an input/output device 512 connected to the mobile station 202. The access node 204 (e.g., BSS 204) also communicates via a packet transport network to one or more serving nodes (e.g., SGSNs), which is not illustrated in FIG. 5. The packet transport network and the serving nodes (e.g., SGSNs) are all well known in the telecommunications field and as such, for clarity, they have not been described or shown herein. The present arrangement of the mobile station 202 and the access node 204 (e.g., BSS 204) are suitable for executing the various methods 300 and 400 disclosed herein with respect to FIGS. 3-4.

It should be noted that the mobile station 202 and the access node 204 (e.g., BSS 204) each comprise many other components which are well known in the telecommunications field but for clarity the well-known components are not described herein. Moreover, it should be noted that a typical network would comprise multiple mobile stations 202, multiple access nodes 204 (e.g., BSSs 204) as well as a plethora of other network nodes. Further, it should be noted that there are many different types of memories 502 and 508 available, such as solid states drives, hard drives, RAM, ROM, EPROM, EEPROM etc. which could be used in implementing embodiments disclosed herein. The memory 502 used for the mobile station 202 would typically be different from the memory 508 used for the access node 204 (e.g., BSS 204), however there is absolutely nothing preventing them for utilizing the same kind of memory. Also, while not indicated in the schematic view, there might be multiple different memories in the devices disclosed. Typically, there would be persistent storage as well as Random Access Memory. Also the processors 504 and 510 indicated in the schematic view can be implemented in many different forms such as an off-the-shelf microcontroller, an ASIC, FPGA etc. . . . .

In view of the foregoing, it should be appreciated that the new one phase access procedure (ASAP) described herein allows for substantially reducing the amount of overhead (thereby increasing the amount of payload transmission space) sent during any given data transmission and therefore substantially improves the PDCH utilization of resources for both uplink and downlink signaling for what is anticipated to become an increasingly high use traffic scenario for mobile stations 202 that are characterized as MTC devices. The improved PDCH utilization of resources does not only come from a reduced number of PACCH blocks that are transmitted or received (see TABLE #1), but since the TLLI or some other mobile station 202 identifier is included in the packet channel request message 206, the specific capabilities of the corresponding mobile station 202 can be determined by the network (e.g., an access node such as BSS 204) as of receiving the packet channel request message 206, and the network (e.g., an access node such as BSS 204) can therefore use this knowledge to assign resources more efficiently. Further, an indicator of the received signal strength (RSSI)

and payload size can be included as part of the supplementary signaling information within the packet channel request message 206, which allows the network (e.g., an access node such as BSS 204) to schedule more appropriate MCSs for UL data from the mobile station 202, thereby effectively reducing the number of radio blocks 210, 212 and 214 needed for transmission. Lastly, the significantly reduced transmission and reception times associated with implementing the new one phase access procedure (ASAP) allows for realizing at the mobile station 202 a substantial power reduction advantage for small data transmissions when compared to the legacy mobile station 102 that is transmitting small data transmissions per the legacy one phase access procedure.

Although multiple embodiments of the present disclosure have been illustrated in the accompanying Drawings and described in the foregoing Detailed Description, it should be understood that the invention is not limited to the disclosed embodiments, but instead is also capable of numerous rearrangements, modifications and substitutions without departing from the present disclosure that as has been set forth and defined within the following claims.

The invention claimed is:

1. A mobile station configured to implement an accelerated system access procedure (ASAP) with an access node, the mobile station comprising:
   at least one processor; and,
   at least one memory that stores processor-executable instructions, wherein the at least one processor interfaces with the at least one memory to execute the processor-executable instructions, whereby the mobile station is operable to:
      transmit, to the access node, a packet channel request message that includes a unique identifier associated with the mobile station, wherein the transmit operation further comprises applying a zero timing advance (TA) when transmitting the packet channel request message after receiving a system information message that has a small cell flag set from the access node; and,
      receive, from the access node, an immediate assignment message that includes the unique identifier associated with the mobile station.

2. The mobile station of claim 1, wherein the mobile station, prior to transmitting the packet channel request message, is further operable to:
   receive, from the access node, the system information message which indicates that the access node supports the reception of a packet channel request message that includes a unique identifier associated with the mobile station.

3. The mobile station of claim 1, wherein the mobile station is further operable to:
   complete a contention resolution after receiving the immediate assignment message including the unique identifier associated with the mobile station.

4. The mobile station of claim 1, wherein the mobile station, after receiving the immediate assignment message, is further operable to:
   transmit, to the access node, one or more uplink data blocks;
   receive, from the access node, a packet uplink ack/nack (PUAN) message, which confirms reception of the one or more uplink data blocks by the access node and which includes a value indicating a portion of an uplink radio block that is to be used by the mobile station for transmitting a logical packet control ack message to confirm reception of the PUAN message; and,
   transmit, to the access node, the logical packet control ack message utilizing the indicated portion of the uplink radio block to confirm reception of the PUAN message.

5. The mobile station of claim 1, wherein the unique identifier associated with the mobile station is a Temporary Logical Link Identifier (TLLI).

6. The mobile station of claim 1, wherein the packet channel request message further comprises one or more of the following:
   a size of uplink payload to be transferred to the access node;
   a request for a downlink biased service;
   a request for an uplink biased service;
   information about a transport protocol to be used to transfer uplink payload to the access node;
   an application type of uplink payload to be transferred to the access node;
   a coverage requirement estimate;
   a TA value used by the mobile station;
   an access priority indicator;
   a multislot class indicator;
   a Received Signal Strength Indicator (RSSI) and payload size; and,
   a mobility factor.

7. A method in a mobile station for implementing an accelerated system access procedure (ASAP) with an access node, the method comprising:
   transmitting, to the access node, a packet channel request message that includes a unique identifier associated with the mobile station, wherein the transmitting step further comprises applying a zero timing advance (TA) when transmitting the packet channel request message after receiving a system information message that has a small cell flag set from the access node; and,
   receiving, from the access node, an immediate assignment message that includes the unique identifier associated with the mobile station.

8. The method of claim 7, wherein prior to transmitting the packet channel request message, the method further comprises:
   receiving, from the access node, the system information message which indicates that the access node supports the reception of a packet channel request message that includes a unique identifier associated with the mobile station.

9. The method of claim 7, further comprising:
   completing a contention resolution after receiving the immediate assignment message including the unique identifier associated with the mobile station.

10. The method of claim 7, wherein after receiving the immediate assignment message, the method further comprises:
   transmitting, to the access node, one or more uplink data blocks;
   receiving, from the access node, a packet uplink ack/nack (PUAN) message, which confirms reception of the one or more uplink data blocks by the access node and which includes a value indicating a portion of an uplink radio block that is to be used by the mobile station for transmitting a logical packet control ack message to confirm reception of the PUAN message; and,
   transmitting, to the access node, the logical packet control ack message utilizing the indicated portion of the uplink radio block to confirm reception of the PUAN message.

11. The method of claim 7, wherein the unique identifier associated with the mobile station is a Temporary Logical Link Identifier (TLLI).

12. The method of claim 7, wherein the packet channel request message further comprises one or more of the following:
- a size of uplink payload to be transferred to the access node;
- a request for a downlink biased service;
- a request for an uplink biased service;
- information identifying a transport protocol to be used to transfer uplink payload to the access node;
- an application type of uplink payload to be transferred to the access node;
- a coverage requirement estimate;
- a TA value used by the mobile station;
- an access priority indicator;
- a multislot class indicator;
- a Received Signal Strength Indicator (RSSI) and payload size; and,
- a mobility factor.

13. An access node configured to implement an accelerated system access procedure (ASAP) with a mobile station, the access node comprising:
- at least one processor; and,
- at least one memory that stores processor-executable instructions, wherein the at least one processor interfaces with the at least one memory to execute the processor-executable instructions, whereby the access node is operable to:
  - receive, from the mobile station, a packet channel request message that includes a unique identifier associated with the mobile station, wherein the receive operation is subsequent to a transmission to the mobile station by the access node of a system information message which has a small cell flag set which indicates that the mobile station is to apply a zero timing advance (TA) when transmitting the packet channel request message; and,
  - transmit, to the mobile station, an immediate assignment message that includes the unique identifier associated with the mobile station.

14. The access node of claim 13, wherein the access node, prior to receiving the packet channel request message, is further operable to:
- broadcast the system information message which indicates that the access node supports the reception of a packet channel request message that includes a unique identifier associated with the mobile station.

15. The access node of claim 13, wherein the access node is further operable to:
- complete a contention resolution after receiving the packet channel request message including the unique identifier associated with the mobile station.

16. The access node of claim 13, wherein the access node, after transmitting the immediate assignment message, is further operable to:
- receive, from the mobile station, one or more uplink data blocks;
- transmit, to the mobile station, a packet uplink ack/nack (PUAN) message, which confirms reception of the one or more uplink data blocks and which includes a value indicating a portion of an uplink radio block that is to be used by the mobile station for transmitting a logical packet control ack message to confirm reception of the PUAN message; and,
- receive, from the mobile station, the logical packet control ack message which utilized the indicated portion of the uplink radio block to confirm reception by the mobile station of the PUAN message.

17. The access node of claim 16, wherein the access node is further operable to:
- transmit, to another mobile station, another PUAN message which confirms reception of one or more uplink data blocks received from the another mobile station and which includes a value indicating another portion of the uplink radio block that is to be used by the another mobile station for transmitting a logical packet control ack message to confirm reception of the another PUAN message; and,
- receive, from the another mobile station, the logical packet control ack message which utilized the indicated another portion of the uplink radio block to confirm reception by the another mobile station of the another PUAN message.

18. The access node of claim 13, wherein the unique identifier associated with the mobile station is a Temporary Logical Link Identifier (TLLI).

19. The access node of claim 13, wherein the packet channel request message further comprises one or more of the following:
- a size of uplink payload to be transferred to the access node;
- a request for a downlink biased service;
- a request for an uplink biased service;
- information identifying a transport protocol to be used to transfer uplink payload to the access node;
- an application type of uplink payload to be transferred to the access node;
- a coverage requirement estimate;
- a TA value used by the mobile station;
- an access priority indicator;
- a multislot class indicator;
- a Received Signal Strength Indicator (RSSI) and payload size; and,
- a mobility factor.

20. A method in an access node for implementing an accelerated system access procedure (ASAP) with a mobile station, the method comprising:
- receiving, from the mobile station, a packet channel request message that includes a unique identifier associated with the mobile station, wherein the receiving step is subsequent to a transmission to the mobile station by the access node of a system information message that has a small cell flag set which indicates that the mobile station is to apply a zero timing advance (TA) when transmitting the packet channel request message; and,
- transmitting, to the mobile station, an immediate assignment message that includes the unique identifier associated with the mobile station.

21. The method of claim 20, wherein prior to receiving the packet channel request message, the method further comprises:
- broadcasting the system information message which indicates that the access node supports the reception of a packet channel request message that includes a unique identifier associated with the mobile station.

22. The method of claim 20, further comprising:
- completing a contention resolution after receiving the packet channel request message including the unique identifier associated with the mobile station.

23. The method of claim 20, wherein after transmitting the immediate assignment message, the method further comprises:
  receiving, from the mobile station, one or more uplink data blocks;
  transmitting, to the mobile station, a packet uplink ack/nack (PUAN) message, which confirms reception of the one or more uplink data blocks and which includes a value indicating a portion of an uplink radio block that is to be used by the mobile station for transmitting a logical packet control ack message to confirm reception of the PUAN message; and,
  receiving, from the mobile station, the logical packet control ack message which utilized the indicated portion of the uplink radio block to confirm reception by the mobile station of the PUAN message.

24. The method of claim 23, further comprising:
  transmitting, to another mobile station, another PUAN message which confirms reception of one or more uplink data blocks received from the another mobile station and which includes a value indicating another portion of the uplink radio block that is to be used by the another mobile station for transmitting a logical packet control ack message to confirm reception of the another PUAN message; and,
  receiving, from the another mobile station, the logical packet control ack message which utilized the indicated another portion of the uplink radio block to confirm reception by the another mobile station of the another PUAN message.

25. The method of claim 20, wherein the unique identifier associated with the mobile station is a Temporary Logical Link Identifier (TLLI).

26. The method of claim 20, wherein the packet channel request message further comprises one or more of the following:
  a size of uplink payload to be transferred to the access node;
  a request for a downlink biased service;
  a request for an uplink biased service;
  information identifying a transport protocol to be used to transfer uplink payload to the access node;
  an application type of uplink payload to be transferred to the access node;
  a coverage requirement estimate;
  a TA value used by the mobile station;
  an access priority indicator;
  a multislot class indicator;
  a Received Signal Strength Indicator (RSSI) and payload size; and,
  a mobility factor.

* * * * *